US012798687B2

(12) United States Patent
Hsu et al.

(10) Patent No.: US 12,798,687 B2
(45) Date of Patent: Nov. 17, 2026

(54) CENTERGATE OVERFLOW DRAINAGE BYPASS

(71) Applicants: Hyundai Motor Company, Seoul (KR); Kia Corporation, Seoul (KR)

(72) Inventors: Eric Hsu, Superior Township, MI (US); Kihyun Cho, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 173 days.

(21) Appl. No.: 18/978,839

(22) Filed: Dec. 12, 2024

(65) Prior Publication Data

US 2026/0167271 A1 Jun. 18, 2026

(51) Int. Cl.
*B62D 25/24* (2006.01)

(52) U.S. Cl.
CPC .................................... *B62D 25/24* (2013.01)

(58) Field of Classification Search
CPC ........ B62D 25/24; B62D 25/07; B62D 33/03; B60Y 2200/141
See application file for complete search history.

(56) References Cited

U.S. PATENT DOCUMENTS

| | | | | | |
|---|---|---|---|---|---|
| 2,715,284 | A * | 8/1955 | Molina | A47L 19/02 | 34/238 |
| 6,796,600 | B1 * | 9/2004 | Ferer | B60P 3/423 | 296/37.6 |
| 8,246,101 | B2 * | 8/2012 | Cicala | B60J 1/1861 | 296/146.16 |

FOREIGN PATENT DOCUMENTS

| | | | | |
|---|---|---|---|---|
| CA | 3028667 C * | 1/2021 | A47L 11/4041 | |

* cited by examiner

*Primary Examiner* — Lori Lyjak
(74) *Attorney, Agent, or Firm* — Fox Rothschild LLP

(57) ABSTRACT

A centergate overflow drainage bypass system is provided. The centergate overflow bypass system may comprise a vehicle comprising a cab portion and a bed portion, and a centergate, positioned between the cab portion and the bed portion. The centergate may comprise one or more drain catch trays configured to catch liquid interior to the centergate, one or more upper drains, and one or more lower drains. The one or more drain catch trays may be configured to guide the liquid to the one or more upper drains. The one or more upper drains may be configured to guide the liquid along a first drain path away from the cab portion and exterior to the centergate. The one or more lower drains may be configured to guide the liquid along a second drain path away from the cab portion and exterior to the centergate.

19 Claims, 8 Drawing Sheets

CENTERGATE OVERFLOW DRAINAGE BYPASS

BACKGROUND

Technical Field

Embodiments of the present disclosure relate to vehicle centergate overflow drainage bypass systems and methods of use.

Background

Pickup trucks comprise a cab area, configured to receive passengers, and a bed area, configured to store cargo. Some pickup trucks include a centergate portion positioned between the cab portion and the bed portion of the pickup truck. The centergate may comprise a door configured to open between the cab and the bed to increase the cargo-carrying capacity of the pickup truck.

There are scenarios in which the cab area of the pickup truck may be deluged with a large influx of water (e.g., during power washing, during storms, etc.). This large influx of water may enter a belt molding area of a centergate closure panel, as shown, e.g., in FIGS. 1A-1B.

A truck 100 having a bed area 102, a cab area 104, and a centergate 106 positioned therebetween is illustratively depicted in FIG. 1A, and a sectional view of the centergate 106 of FIG. 1A along section A-A is illustratively depicted in FIG. 1B.

The centergate 106 may comprise, on the bed area 102 side, an outer panel 108, a bed gap hider 110, and a body sealing component 112. The bed area 102 of the truck 100 may comprise a bed floor 114 and a floor structure 116. The centergate 106 may comprise, on the cab area 104 side, an inner panel 118 and a trim panel 120. Above the centergate 106, the truck 100 may comprise a glass component 122. The centergate 106 may be configured to open in direction 124 along hinge 126.

Interior to the centergate 106, the centergate 106 may comprise one or more gate-side drains 128, one or more body-side drains 132, and one or more seals (e.g., one or more gate seals 130).

The centergate 106 may comprise one or more weak seal areas 134, enabling water intrusion 136 to seep into the interior of the centergate 106 to be drained through the one or more gate-side drains 128 and/or the one or more body-side drains 132. However, insufficient drainage rates in this area may result in an overflow of water into the cab area.

For example, when a user opens the centergate 106 before all water has been drained, water may seep into the cab area 104 in direction 138. By way of another example, water may drip into the cab area 104 in direction 140 due to an overflow of water.

For at least these reasons, a centergate configured to aid in preventing water seepage into the cab area when there is an influx of water in the bed area is needed.

SUMMARY

According to an object of the present disclosure, a centergate overflow drainage bypass system is provided.

The centergate overflow bypass system may comprise a vehicle comprising a cab portion and a bed portion, and a centergate, positioned between the cab portion and the bed portion. The centergate may comprise one or more drain catch trays configured to catch liquid interior to the centergate, one or more upper drains. In certain preferred aspects, the centergate may further comprise one or more lower drains. The one or more drain catch trays may be configured to guide the liquid to the one or more upper drains. The one or more upper drains may be configured to guide the liquid along a first drain path away from the cab portion and exterior to the centergate. The one or more lower drains may be configured to guide the liquid along a second drain path away from the cab portion and exterior to the centergate.

According to an exemplary embodiment, the one or more lower drains may be configured to guide the liquid along a second drain path away from the cab portion and exterior to the centergate when the liquid overflows the one or more drain catch trays.

According to an exemplary embodiment, wherein the centergate overflow bypass system may comprise one or more one-way drain plugs configured to enable water to drain out of the one or more upper drains, exterior to the centergate, and prevent water from entering an interior of the centergate through the one or more upper drains.

According to an exemplary embodiment, wherein the centergate overflow drainage bypass system may comprise one or more run channels configured to guide water that has intruded into an interior of the centergate to the one or more drain catch trays.

According to an exemplary embodiment, the one or more upper drains may be positioned above the one or more lower drains.

According to an exemplary embodiment, the centergate may be configured to form a barrier between the cab portion and the bed portion.

According to an exemplary embodiment, the vehicle may comprise a pickup truck.

According to an object of the present disclosure, a centergate is provided. The centergate may comprise one or more drain catch trays configured to catch liquid interior to the centergate, one or more upper drains, and one or more lower drains. The one or more drain catch trays may be configured to guide the liquid to the one or more upper drains. The one or more upper drains may be configured to guide the liquid along a first drain path exterior to the centergate. The one or more lower drains may be configured to guide the liquid along a second drain path exterior to the centergate.

According to an exemplary embodiment, the one or more lower drains may be configured to guide the liquid along a second drain path exterior to the centergate when the liquid overflows the one or more drain catch trays.

According to an exemplary embodiment, the centergate may comprise one or more one-way drain plugs configured to enable water to drain out of the one or more upper drains, exterior to the centergate, and prevent water from entering an interior of the centergate through the one or more upper drains.

According to an exemplary embodiment, the centergate may comprise one or more run channels configured to guide water that has intruded into an interior of the centergate to the one or more drain catch trays.

According to an exemplary embodiment, the one or more upper drains may be positioned above the one or more lower drains.

According to an exemplary embodiment, the centergate may be configured to form a barrier between a cab portion and a bed portion of a vehicle.

According to an exemplary embodiment, the one or more upper drains may be configured to guide the liquid along the first drain path away from the cab portion and exterior to the centergate.

According to an exemplary embodiment, the one or more lower drains may be configured to guide the liquid along the second drain path away from the cab portion and exterior to the centergate.

According to an exemplary embodiment, the vehicle may comprise a pickup truck.

In preferred aspects, a pickup truck is provided comprising: a) a cab portion and a bed portion; and b) a centergate, positioned between the cab portion and the bed portion, the centergate comprising: i) one or more drain catch trays configured to catch liquid interior to the centergate; and ii) one or more upper drains, wherein: a) the one or more drain catch trays are configured to guide the liquid to the one or more upper drains, and b) the one or more upper drains are configured to guide the liquid along a first drain path away from the cab portion and exterior to the centergate. In certain preferred aspects, the centergate may further comprise one or more lower drains configured to guide the liquid along a second drain path exterior to the centergate.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1A:
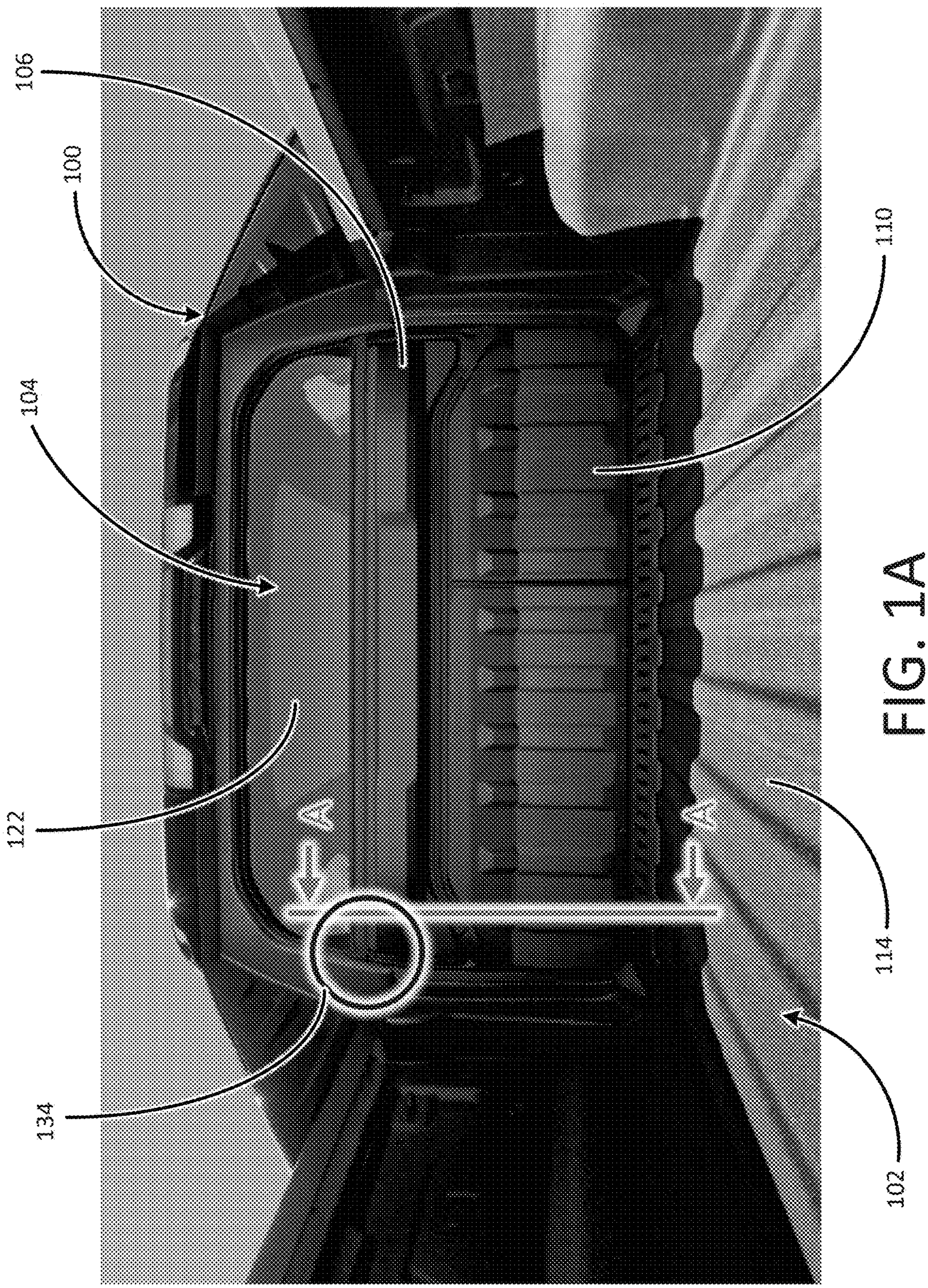
FIG. 1A PRIOR ART
FIG. 1A illustrates an example rear view of a pickup truck having a centergate.
Figure 1B:
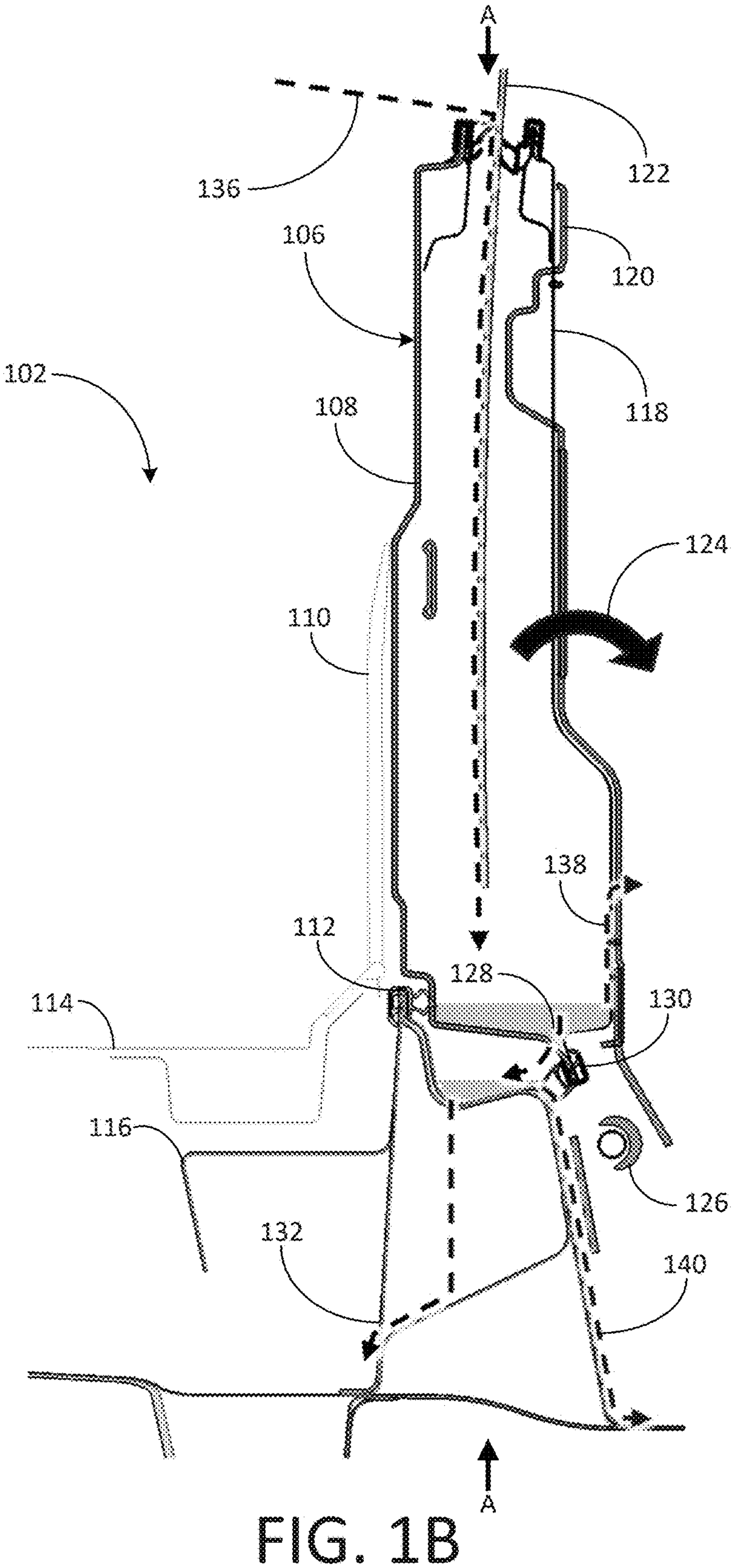
FIG. 1B PRIOR ART
FIG. 1B illustrates a sectional view of the centergate of FIG. 1A along section A-A, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to exemplary embodiments, vehicle centergate overflow drainage bypass systems and methods of use are provided.

As discussed above, in one aspect, a centergate overflow drainage bypass system, comprising: 1) a vehicle comprising a cab portion and a bed portion; and 2) a centergate, positioned between the cab portion and the bed portion, the centergate comprising: i) one or more drain catch trays configured to catch liquid interior to the centergate; and ii) one or more upper drains, wherein: a) the one or more drain catch trays are configured to guide the liquid to the one or more upper drains, and b) the one or more upper drains are configured to guide the liquid along a first drain path away from the cab portion and exterior to the centergate.

In certain preferred aspects, the centergate overflow drainage bypass system may further comprise one or more lower drains configured to guide the liquid along a second drain path away from the cab portion and exterior to the centergate.

In one aspect, a centergate is provided comprising: i) one or more drain catch trays configured to catch liquid interior to the centergate; and ii) one or more upper drains, wherein: a) the one or more drain catch trays are configured to guide the liquid to the one or more upper drains, and b) the one or more upper drains are configured to guide the liquid along a first drain path exterior to the centergate. In certain preferred aspects, the centergate further comprises one or more lower drains configured to guide the liquid along a second drain path exterior to the centergate.

Figure 2A:
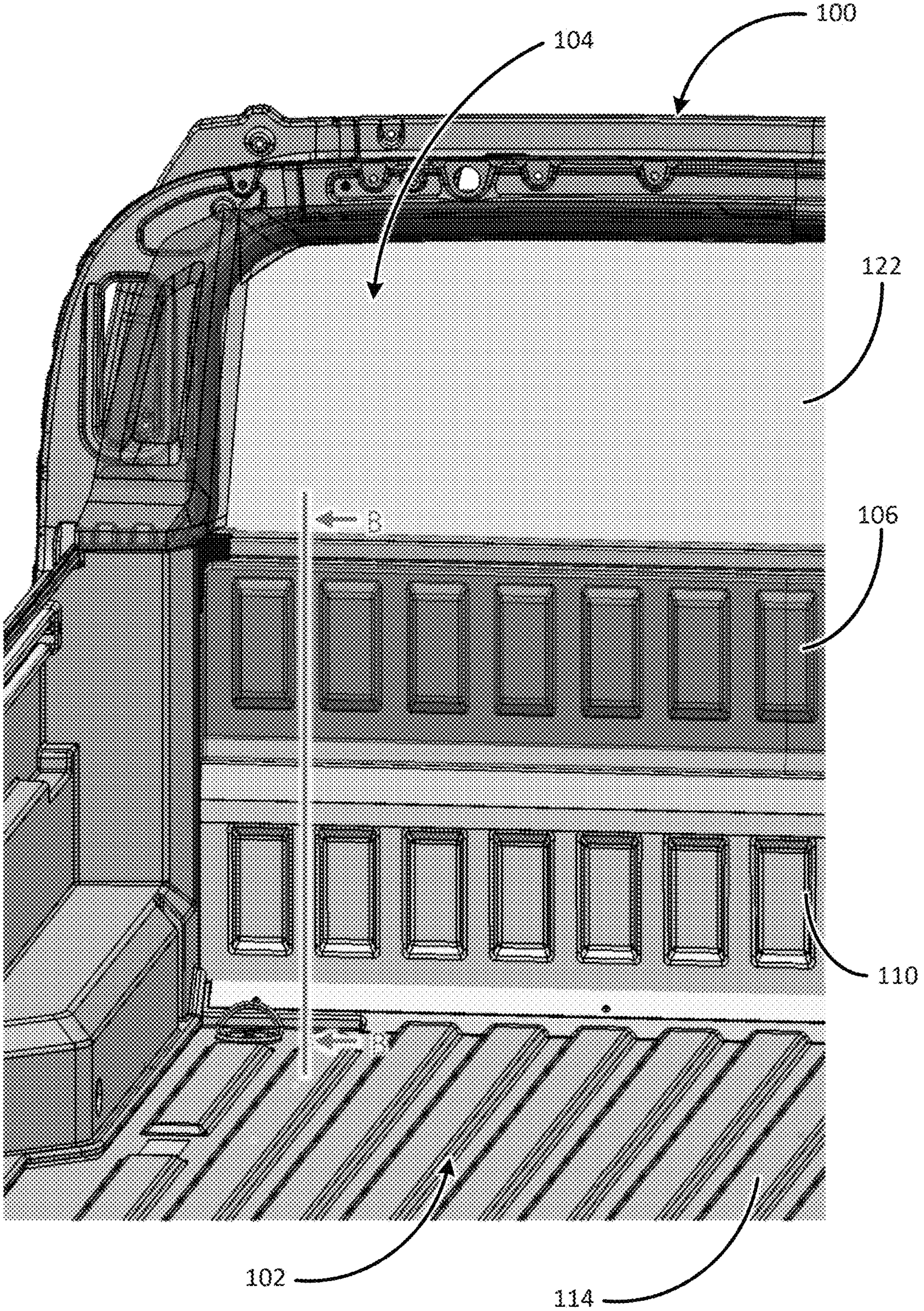
FIG. 2A illustrates an example rear view of a pickup truck having a centergate comprising a water overflow drainage bypass, according to an exemplary embodiment of the present disclosure.
Figure 2B:
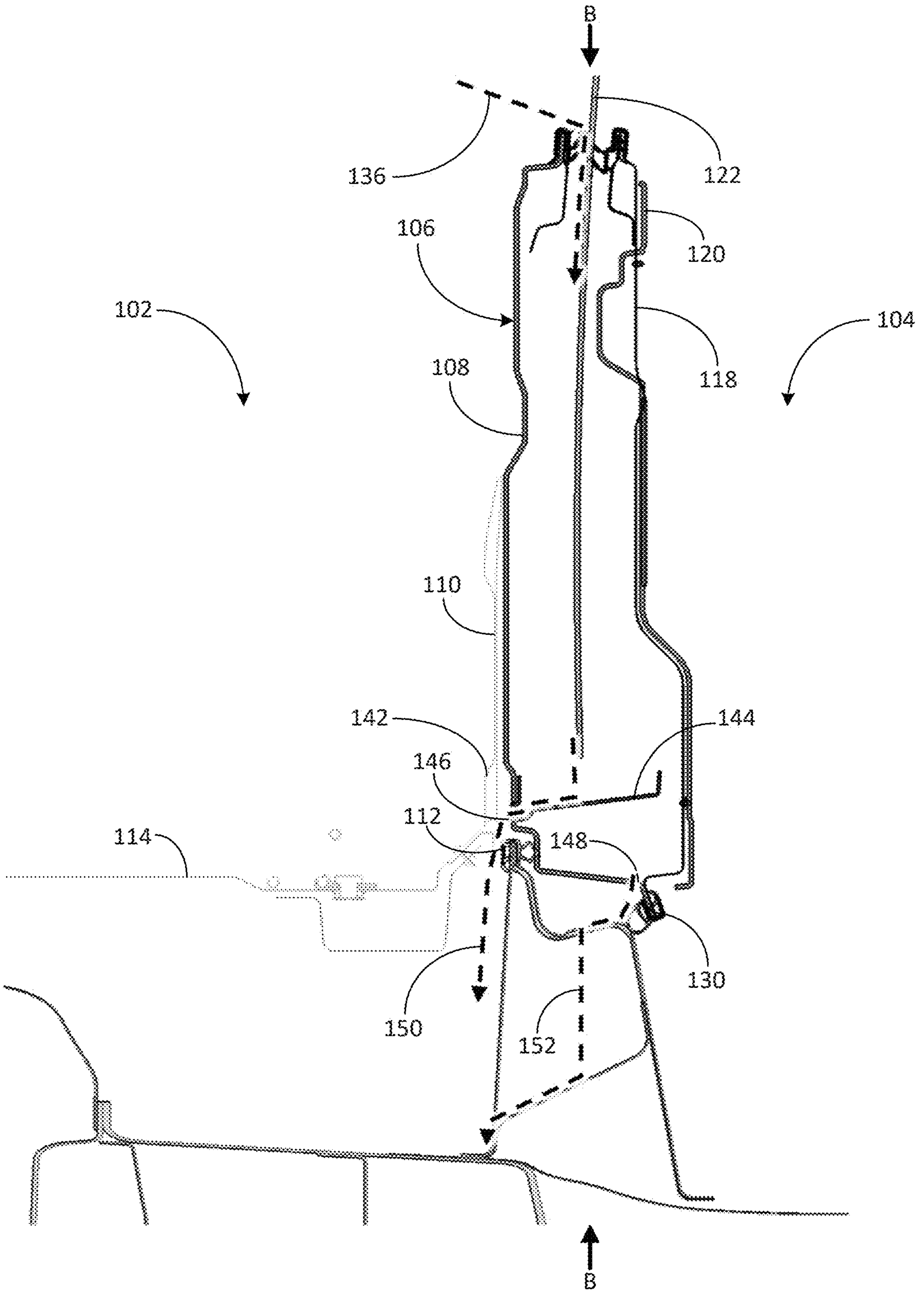
FIG. 2B illustrates a sectional view of the centergate of FIG. 2A along section B-B, according to an exemplary embodiment of the present disclosure.
Figure 3:
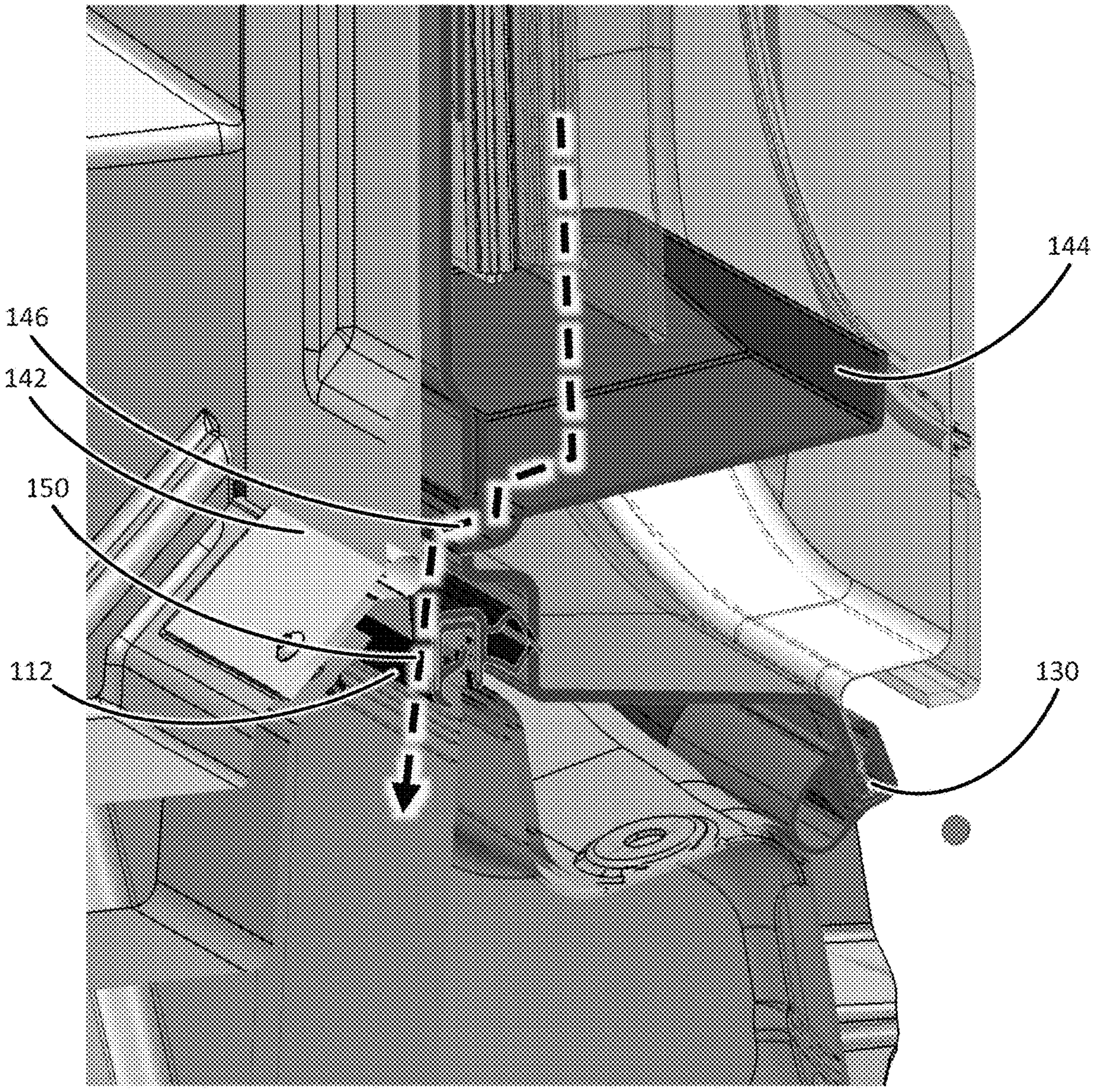
FIG. 3 illustrates a lower perspective view of a portion of the centergate of FIG. 2A showing a drain catch tray, according to an exemplary embodiment of the present disclosure.
Figure 4:
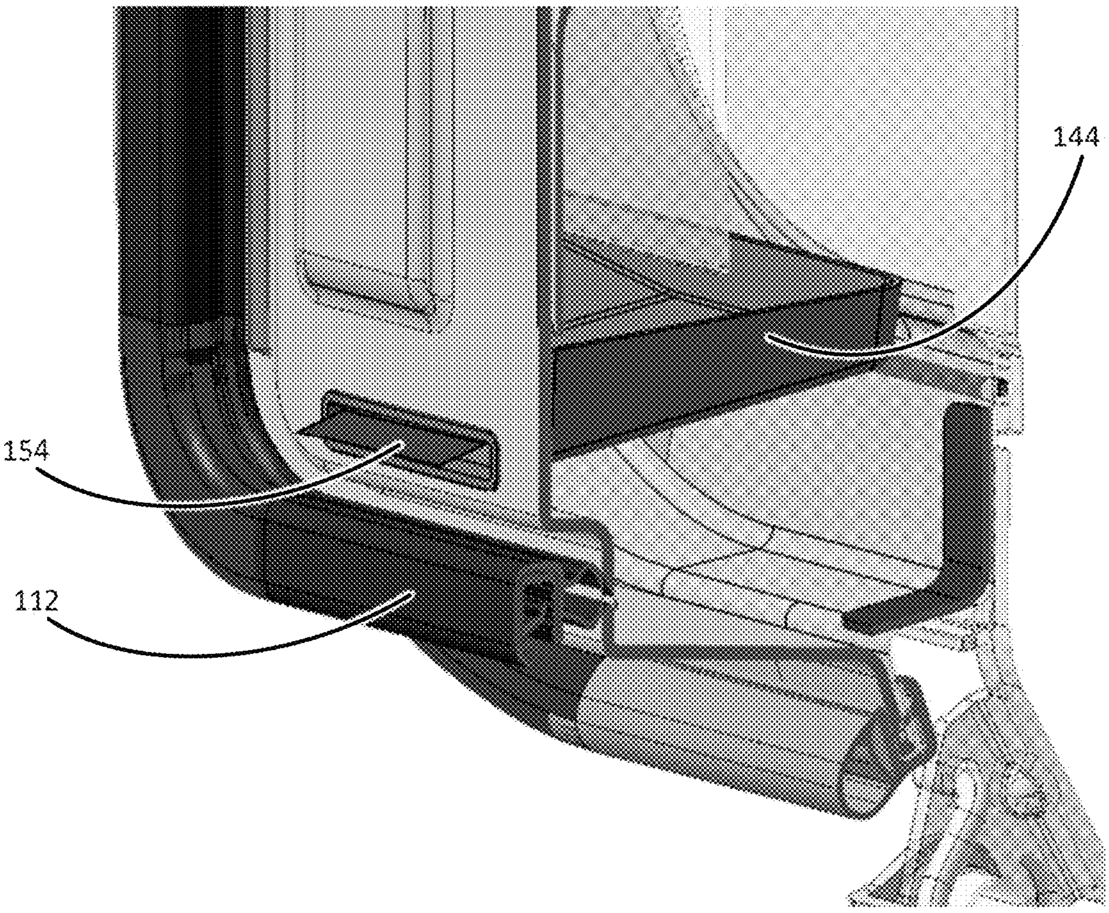
FIG. 4 illustrates a perspective sectional view of the centergate of FIG. 2A illustrating a drain plug, according to an exemplary embodiment of the present disclosure.
Figure 5:
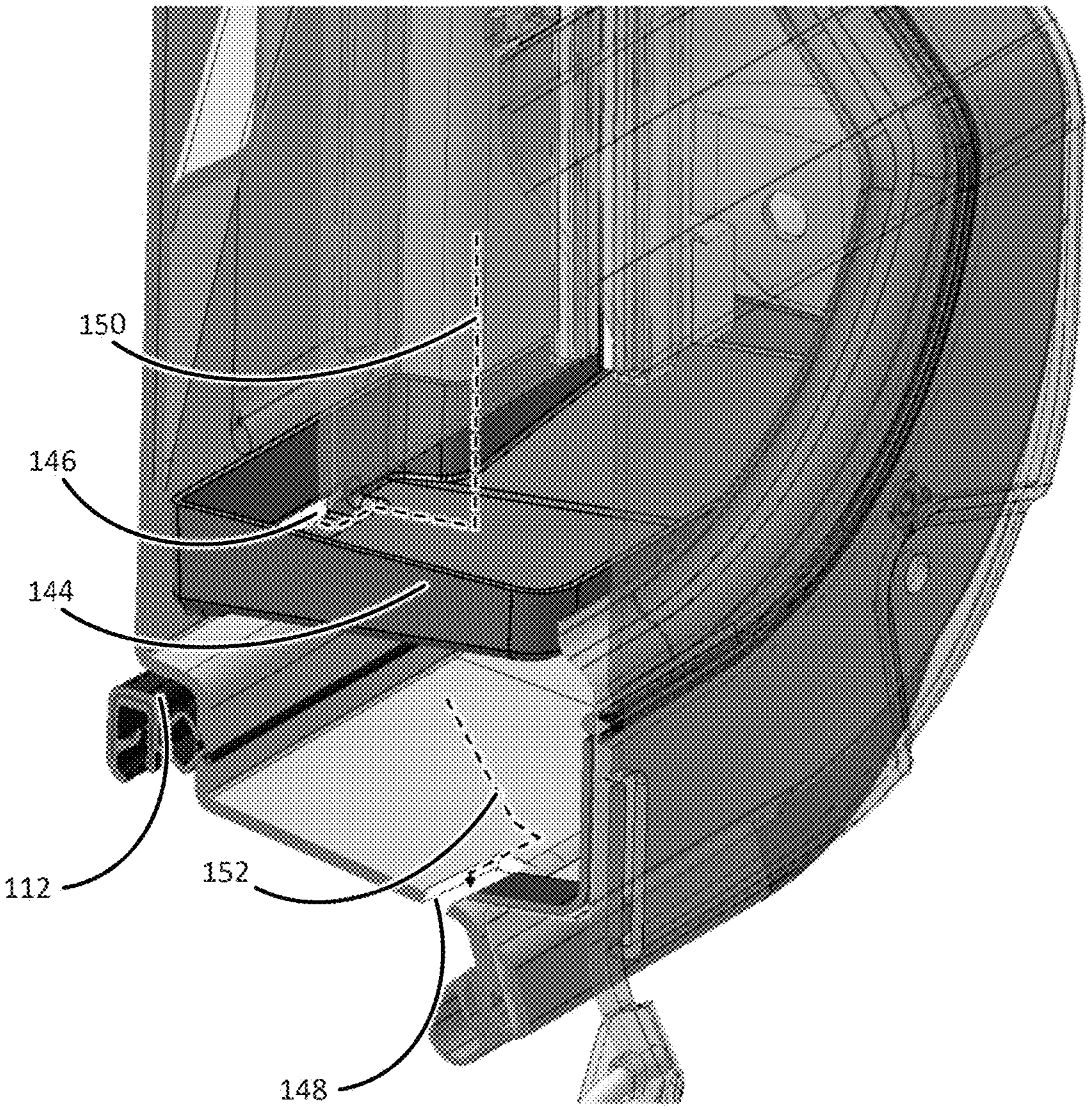
FIG. 5 illustrates a perspective sectional view of the centergate of FIG. 2A illustrating a first drain path and a second drain path, according to an exemplary embodiment of the present disclosure.
Figure 6:
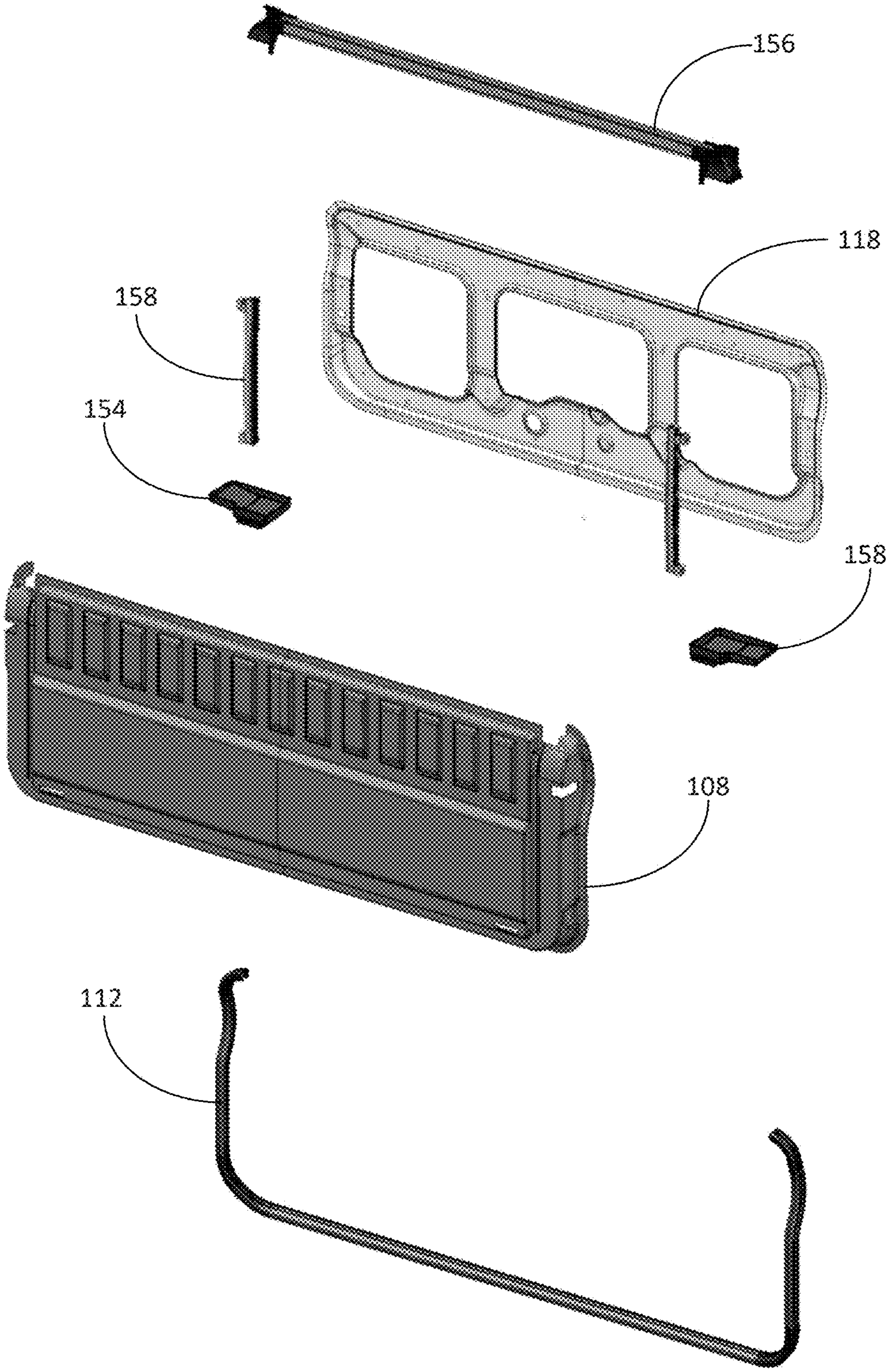
FIG. 6 illustrates an exploded view of several components of the centergate of FIG. 2A, according to an exemplary embodiment of the present disclosure.

Referring now to FIGS. 2A-6, a rear view of a pickup truck 100 having a centergate 106 comprising a water overflow drainage bypass (FIG. 2A), a sectional view of the centergate 106 of FIG. 2A along section B-B (FIG. 2B), a lower perspective view of a portion of the centergate 106 of FIG. 2A showing a drain catch tray 144 (FIG. 3), a perspective sectional view of the centergate 106 of FIG. 2A illustrating a drain plug 154 (FIG. 4), a perspective sectional view of the centergate 106 of FIG. 2A illustrating a first drain path 150 and a second drain path 152 (FIG. 5), and an exploded view of several components of the centergate 106 of FIG. 2A (FIG. 6) are illustratively depicted, in accordance with exemplary embodiments of the present disclosure.

According to an exemplary embodiment, a truck 100 may comprise a bed area 102, a cab area 104, and a centergate 106. According to an exemplary embodiment, the centergate 106 may be configured to form a barrier between the cab portion 104 and the bed portion 102.

According to an exemplary embodiment, the centergate 106 may be configured to be positioned between the bed portion/area 102 and the cab portion/area 104 of the pickup truck 100. According to an exemplary embodiment, the centergate 106 may be positioned along the pickup truck 100 such that the centergate 100 defines the edge of the internal cavity of the cab portion 104 and protects internal components as well as cab portion 104 occupants. While a pickup truck 100 is shown and described, it is noted that the centergate 106 may be positioned along one or more other suitable types of vehicle.

The centergate 106 may comprise, on the bed portion 102 side, an outer panel 108, a bed gap hider 110, a body sealing component 112, and a gap hider 142. According to an exemplary embodiment, the body sealing components 112 may comprise a gate-side seal. According to an exemplary embodiment, the centergate 106 may comprise a belt seal 156 positioned between the centergate 106 and the window 122. The bed portion 102 of the truck 100 may comprise a bed floor 114 and/or a floor structure. The centergate 106 may comprise, on the cab portion 104 side, an inner panel 118 and a trim panel 120. Above the centergate 106, the truck 100 may comprise a glass component 122 above the centergate 106. The centergate 106 may be configured to open along a hinge, similar to that shown in FIG. 1A.

Interior to the centergate 106, the centergate 106 may comprise one or more drain catch trays 144, one or more upper drains 146, one or more lower drains 148, and one or more seals (e.g., one or more gate seals 130). According to an exemplary embodiment, the gap hider 142 may be configured to hide the openings of the one or more upper drains 146.

Water intrusion 136 may occur within the centergate 106, causing water to seep into the interior of the centergate 106. The one or more drain catch trays 144, the one or more upper drains 146, and the one or more lower drains 148 are configured to function as a water overflow drainage bypass to aid in preventing water from seeping into the cab portion 104. According to an exemplary embodiment, the one or more upper drains 146 may be positioned above the one or more lower drains 148.

According to an exemplary embodiment, the centergate 106 may be configured to collect water in the one or more drain catch trays 104. The one or more drain catch trays 144 may be configured to guide the water (or other suitable liquid) to the one or more upper drains 146 along a first drain path 150 and away from the cab portion 104, outside of/exterior to the centergate 106.

In the event of water overflowing over the one or more drain catch trays 144, the interior of the centergate 106 may be configured to guide the overflow water to the one or more lower drains 148 along a second drain path 152 and away from the cab portion 104, outside of/exterior to the centergate 106.

According to an exemplary embodiment, the centergate 106 may comprise one or more run channels 158 configured to guide water that has intruded into the interior of the centergate 106 to the one or more drain catch trays 144. According to an exemplary embodiment, the one or more upper drains 146 may comprise one or more one-way drain plugs 154. The one or more one-way drain plugs 154 may be configured to enable water to drain out of the one or more upper drains 146, exterior to the centergate 106, and prevent water from entering the interior of the centergate 106 through the one or more upper drains 146.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A centergate overflow drainage bypass system, comprising:
- 1) a vehicle comprising a cab portion and a bed portion; and
- 2) a centergate, positioned between the cab portion and the bed portion, the centergate comprising:
  - i) one or more drain catch trays configured to catch liquid interior to the centergate; and
  - ii) one or more upper drains,
    wherein:
    - a) the one or more drain catch trays are configured to guide the liquid to the one or more upper drains, and
    - b) the one or more upper drains are configured to guide the liquid along a first drain path away from the cab portion and exterior to the centergate.

2. The centergate overflow drainage bypass system of claim 1, further comprising one or more lower drains configured to guide the liquid along a second drain path away from the cab portion and exterior to the centergate.

3. The centergate overflow drainage bypass system of claim 2, wherein the one or more lower drains are configured to guide the liquid along a second drain path away from the cab portion and exterior to the centergate when the liquid overflows the one or more drain catch trays.

4. The centergate overflow drainage bypass system of claim 1, further comprising one or more one-way drain plugs configured to enable water to drain out of the one or more upper drains, exterior to the centergate, and prevent water from entering an interior of the centergate through the one or more upper drains.

5. The centergate overflow drainage bypass system of claim 1, further comprising one or more run channels configured to guide water that has intruded into an interior of the centergate to the one or more drain catch trays.

6. The centergate overflow drainage bypass system of claim 2, wherein the one or more upper drains are positioned above the one or more lower drains.

7. The centergate overflow drainage bypass system of claim 1, wherein the centergate is configured to form a barrier between the cab portion and the bed portion.

8. The centergate overflow drainage bypass system of claim 1, wherein the vehicle comprises a pickup truck.

9. A centergate, comprising:
- i) one or more drain catch trays configured to catch liquid interior to the centergate; and
- ii) one or more upper drains,
  wherein:
  - a) the one or more drain catch trays are configured to guide the liquid to the one or more upper drains, and
  - b) the one or more upper drains are configured to guide the liquid along a first drain path exterior to the centergate.

10. The centergate of claim 9, further comprising one or more lower drains configured to guide the liquid along a second drain path exterior to the centergate.

11. The centergate of claim 10, wherein the one or more lower drains are configured to guide the liquid along a second drain path exterior to the centergate when the liquid overflows the one or more drain catch trays.

12. The centergate of claim 9, further comprising one or more one-way drain plugs configured to enable water to drain out of the one or more upper drains, exterior to the centergate, and prevent water from entering an interior of the centergate through the one or more upper drains.

13. The centergate of claim 9, further comprising one or more run channels configured to guide water that has intruded into an interior of the centergate to the one or more drain catch trays.

14. The centergate of claim 10, wherein the one or more upper drains are positioned above the one or more lower drains.

15. The centergate of claim 14, wherein the centergate is configured to form a barrier between a cab portion and a bed portion of a vehicle.

16. The centergate of claim 14, wherein the one or more upper drains are configured to guide the liquid along the first drain path away from the cab portion and exterior to the centergate.

17. The centergate of claim 14, wherein the one or more lower drains are configured to guide the liquid along the second drain path away from the cab portion and exterior to the centergate.

18. The centergate of claim 14, wherein the vehicle comprises a pickup truck.

19. A pickup truck, comprising:

1) a cab portion and a bed portion; and 2) a centergate, positioned between the cab portion and the bed portion, the centergate comprising:

i) one or more drain catch trays configured to catch liquid interior to the centergate; and ii) one or more upper drains, wherein:

a) the one or more drain catch trays are configured to guide the liquid to the one or more upper drains, and b) the one or more upper drains are configured to guide the liquid along a first drain path away from the cab portion and exterior to the centergate.

* * * * *